Dec. 8, 1953 — R. B. RESEK — 2,661,926

ROTARY PLUG TYPE VALVE

Filed Aug. 10, 1950

INVENTOR.
Robert B. Resek
BY John N. Wolfram
Agent

Patented Dec. 8, 1953

2,661,926

UNITED STATES PATENT OFFICE 2,661,926

ROTARY PLUG TYPE VALVE

Robert B. Resek, Warrensville Heights, Ohio, assignor to The Parker Appliance Company, Cleveland, Ohio, a corporation of Ohio Application August 10, 1950, Serial No. 178,677

11 Claims. (Cl. 251—113)

This invention relates to valves and particularly to valves of the rotary plug type and in which individual sealing elements are carried within the valve ports and are engageable with the valve plug for sealing the ports from the valve chamber.

It is an object of the invention to provide a valve of the type described in which a minimum amount of effort is required for turning the valve plug to various angular positions.

It is another object to provide a rotary plug type valve in which a good indexing "feel" is provided for indicating to the operator when the plug is in a selected angular position.

It is another object to provide a rotary plug type valve having individual sealing units located in the valve port and engageable with the plug and in which there will be a minimum amount of wear on both the plug and the sealing element due to sliding engagement therebetween when the plug is turned to various angular positions.

It is another object to provide a rotary plug type valve having plug engaging sealing elements within the valve ports and in which the elements are yieldably seated against the plug at selected angular positions of the latter but in which the elements are moved out of contact with the plug when the latter is moved to angular positions intermediate the selected positions.

It is another object of the invention to provide certain forms of valves of the type described with sealing elements which may be moved away from the valve plug when the latter is rotated and in which the movement away from the plug is guided so that the sealing element will not tilt and will be moved free of the plug at all points.

It is another object of the invention to provide certain forms of valves of the type described with means for moving only one side of the sealing element away from the valve plug when the latter is moved away from a selected angular position.

Other objects of the invention will become apparent from a detailed description and from the drawings in which.

Figure 1:
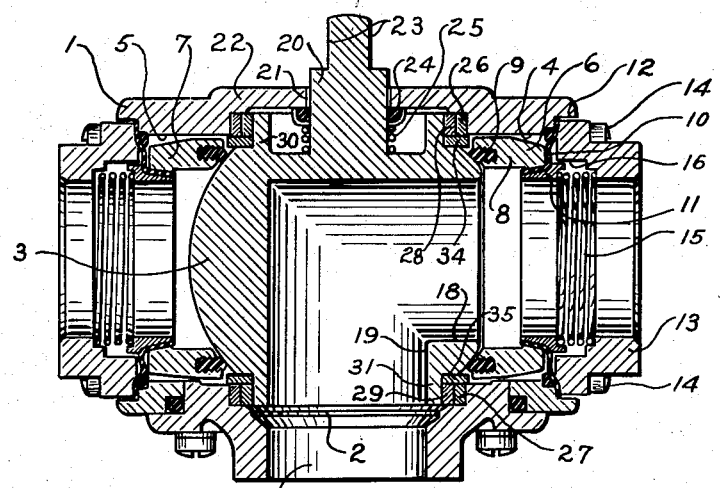
Fig. 1 is a longitudinal sectional view through a valve showing the valve plug in a selected angular position and with the port sealing elements in seated position against the valve plug.

As illustrated in the drawings the invention comprises a valve casing 1 having a valve chamber 2 in which a valve plug 3 is rotatably mounted. In the illustrated embodiment the valve plug 3 is shown as having a spherical portion which is adapted to serve as a sealing surface. However, in other embodiments of the invention, the valve plug may be formed with a cylindrical surface instead of a spherical surface.

The valve casing is formed with radial ports 4 and 5 leading to the valve chamber 2. Mounted within the radial ports 4 and 5 are identical port sealing elements generally designated as 6 and 7, respectively. Since they are alike, a description of one will serve as a description of the other, and like numbers are used to designate the component parts of both.

The port sealing element 6 includes a carrier 8 of metal or other hard material having a deformable or rubber-like sealing gasket 9 at the inner end thereof. A flexible rubber-like diaphragm 10 is clamped to the outer end of the carrier 8 by means of a hollow bushing 11. The outer margin of the diaphragm 10 is sealingly clamped in the bottom of the port counterbore 12 by a port adapter 13, the latter being held in place by screws 14 or any other suitable fastening means. A spring 15 bears against the bushing 11 and constantly urges the port sealing element 6 inwardly toward the valve plug 3.

The particular design of the port sealing elements 6 and 7 do not form part of the present invention but is described and claimed in copending application Serial Numbers 15,645 filed March 18, 1948 and 135,809, filed December 29, 1949.

The valve casing includes an axial port 17 in the bottom wall thereof which also leads to the valve chamber 2. The valve plug 3 has a passage therethrough which comprises an axial branch 19 which is in constant register with the axial port 17 and a radial branch 18 which may be shifted to various selected angular positions including positions in which it will register with either of the casing ports 4 or 5.

One end of the valve plug is formed with a stem 20 which is adapted to project through a hole 21 in the upper wall 22 of the valve casing. The outer end of the stem is slabbed as at 23 so that a suitable handle, not shown, may be attached thereto for rotating the valve plug. The stem is sealed by a packing 24 which is urged against the casing wall 22 by a spring 25.

The valve plug is journalled within the valve casing by bearing rings located at either end of the plug. Rings 26 and 27 are press fitted within counterbores in the valve casing and rings 28 and 29 are press fitted upon cylindrical extensions 30 and 31 of the valve plug.

Figure 2:
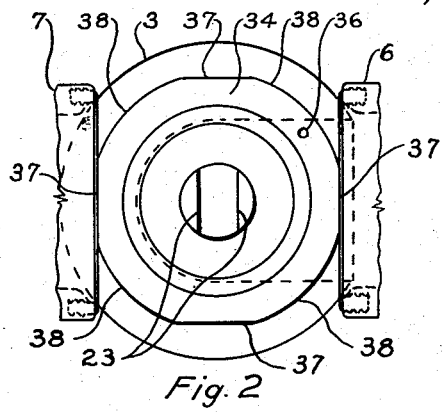
Fig. 2 is a fragmentary plan view of the valve plug with the port sealing elements seated thereagainst.

Beneath the bearing rings 28 and 29 are mounted cam rings 34 and 35, the ring 34 being non-rotatably fixed to the plug by means of the pin 36 as shown in Figure 2 and ring 35 is fixed to the plug by a similar pin not shown. The cam rings are formed of metal or other hard material which will have a relatively low coefficient of friction when in engagement with the carrier members 8.

Figure 3:
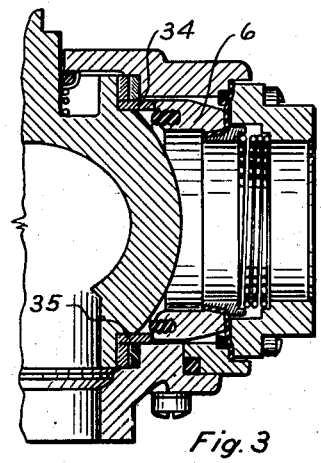
Fig. 3 is a longitudinal quarter section view of the valve shown in Fig. 1 except with the valve plug in an intermediate position and with the port sealing element moved out of contact with the valve plug.
Figure 4:
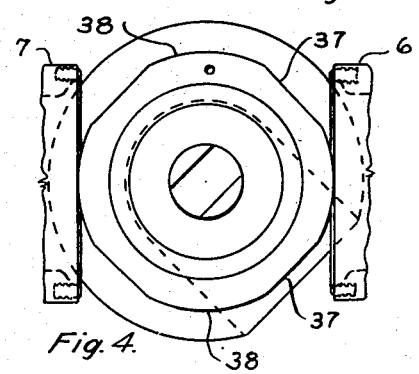
Fig. 4 is a plan view of the valve plug in an intermediate position corresponding to Fig. 3 and with a fragmentary showing of the plug sealing elements in their position out of contact with the plug.

Each of the cam rings 34 and 35 are provided with a series of cut-outs 37 along their outer margin. The cut-outs are similarly spaced about the periphery of both rings and the rings are so mounted upon the valve plug that the cut-outs 37 for the rings 34 are in alignment with the similar cut-outs of the rings 35. The cam rings 34 and 35 are located opposite the inner end of the port sealing elements 6 and 7. The diameter of the rings is such that when the curved portions 38 between the cut-outs 37 are moved opposite the port sealing elements 6 and 7, the latter will be moved radially outward so that the gaskets 9 will be out of contact with the valve plug as shown in Figs. 3 and 4. On the other hand, the cut-outs 37 are so dimensioned that when they are opposite the port sealing elements 6 and 7 the cam rings 34 and 35 will be out of contact with the port sealing elements and the gaskets 9 will be moved into contact with the valve plug as shown in Figures 1 and 2 due to the action of the springs 15.

By reference to the figures it will be seen that in any selected angular position of the plug in which any of the cut-outs 37 are opposite the port sealing elements 6 and 7, the latter will be in sealing contact with the valve plug 3. As soon as the plug is started to be rotated from such selected position, the cam surfaces 38 will engage the port sealing elements and move them out of contact with the valve plug. As soon as a new pair of cut-outs 37 come into alignment with the port sealing elements, the latter will again be permitted to engage in sealing contact with the valve plug.

Thus, during the greater part of the turning movement from one selected position to the other the sealing elements will be moved outwardly and held in a position with the rubber-like gasket 9 out of contact with the valve plug. The coefficient of friction between the hard cam rings and carrier 8 is less than that between the valve plug 3 and the rubber-like gaskets 9 hence there will be less frictional resistance to turning of the plug when gaskets 9 are unseated from the plug than if they were permitted to remain seated thereagainst. Since the gaskets 9 are lifted out of frictional contact with the valve plug when the latter is rotated it is not necessary to provide highly polished surfaces on the valve plug for minimizing frictional resistance with the gaskets 9.

The present method of moving the valve sealing elements out of contact with the valve plug when turning the latter from one selected position to another not only serves to reduce the amount of turning force required but also provides a highly satisfactory indexing indicator for the valve. When the valve plug is in a selected angular position with a pair of cut-outs 37 opposite the sealing elements 6 and 7, as viewed in Fig. 2, a relatively high turning force is required to be applied to the valve plug to cause the cam rings to move the sealing elements against the action of the springs 15 so that the gaskets 9 are out of contact with the valve plug. As soon as the gaskets are out of contact and the curved cam surfaces 38 are riding against the carriers 8 there will be relatively less turning force required to rotate the valve plug. When a new pair of cut-outs 37 is brought into registration with the valve sealing elements the gaskets 9 again come in contact with the valve plug. The difference in the amount of turning force required to rotate the plug when it is in a selected position with the cut-outs 37 opposite the carriers 8 and with the gaskets 9 in contact with the plug as compared with the force required to rotate the plug in an intermediate position with the curved portions 38 opposite the carriers and with the gaskets 9 out of contact with the plug is sufficient to provide a definite feel to the hand of the operator so that he can readily tell when a new pair of cut-outs 37 has come opposite the sealing elements and hence when a new selected angular position of the valve plug has been reached.

In the form of the invention as shown in Figures 1 and 3, the valve plug has been fitted with cam rings 34 and 35 at either end of the plug so that each port sealing element will be contacted simultaneously at diametrically opposite points. This causes the valve sealing element to be moved away from the valve plug at both the upper and lower ends as viewed in the drawings. In this form of the invention it is preferable to form the carrier 8 and the bushing 11 so as to closely fit within the opposed wall surfaces of the casing port 4 and the counterbore 16 of the port adapted so that the sealing element cannot tilt sidewards to drag one side of the gasket 9 against the plug 3 as the latter is rotating. In other words, the valve sealing element is guided in its movement away from the valve plug so that no part of the gasket 9 will touch the plug while the latter is in an itermediate position between selected positions.

Figure 5:
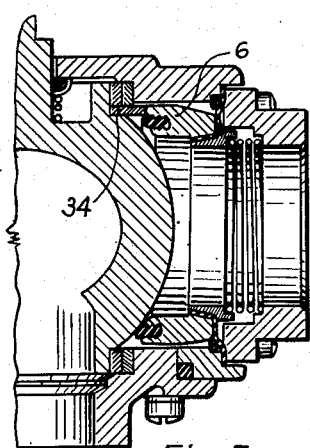
Fig. 5 is a longitudinal quarter section view through a modified form of valve in which means is provided for moving only one side of the port sealing elements away from the valve plug.

In the form of the invention illustrated in Figure 5 the valve plug has been fitted with only a single cam ring 34 at the upper end of the plug as viewed in the drawing. In such case enough clearance may be provided between the carrier 8 and the port bore 4 and between the bushing 11 and the adapter counterbore 16 so that the sealing element may tilt slightly as shown. With this arrangement the greater portion of the exposed face of the gasket 9 is moved out of engagement with the valve plug and hence the greater portion of the resistance to turning of the valve plug due to the friction of the gasket 9 against the rotor is eliminated.

In addition to reducing the torque required to rotate the valve plug, the unseating of the port sealing elements greatly reduces the amount of wear between the gaskets 9 and the valve plug to provide a valve of longer life.

Although only two forms of the invention are shown in the drawing, it is obvious that various minor changes in the particular construction or arrangement of the valve parts may be made without departing from the scope of the present invention. Also, although the drawings illustrate a valve body having two radial ports and one axial port, it is obvious that the number and spacing of the radial parts may be varied and also that the axial port may be omitted. If such changes are made, the passage through the plug and the number and spacing of the cut-outs 37 should be changed accordingly.

I claim:

1. A valve comprising a casing having a valve chamber and a port leading thereto, a valve plug mounted in said chamber and rotatable to selected angular positions, said plug having a sealing surface, a sealing element movably mounted in said port, a yieldable element holding the sealing element in engagement with the sealing surface of the plug in selected angular positions of said plug, and a cam surface on the plug engageable with said sealing element for moving said sealing element out of contact with said plug when the latter is moved to an angular position intermediate said selected positions.

2. A valve comprising a casing having a valve chamber and a port leading thereto, a valve plug mounted in said chamber and rotatable to selected angular positions, a sealing element movably mounted in said port, a yieldable element holding the sealing element in engagement with the plug in selected angular positions of said plug, and a cam carried by said plug and engageable with said sealing element for moving said sealing element out of contact with said plug when the latter is moved to an angular position intermediate said selected positions.

3. A valve comprising a casing having a valve chamber and a port leading thereto, a valve plug mounted in said chamber and rotatable to selected angular positions, a sealing element movably mounted in said port and having a sealing surface engageable with the plug in selected angular positions of said plug, a spring constantly urging said sealing element toward said plug, and a cam rotatable with said plug and engageable with said sealing element for moving said sealing element against said spring and out of contact with said plug when said plug is moved from one of said selected positions.

4. A valve comprising a casing having a valve chamber and a port leading thereto, a valve plug mounted in said chamber and rotatable to selected angular positions, a sealing element movably mounted in said port, a yieldable element holding the sealing element in engagement with the plug in selected angular positions of said plug, and a cam carried by said plug and engageable with said sealing element for moving said sealing element out of contact with at least a portion of said plug when said plug is moved to an angular position intermediate said selected positions.

5. A valve comprising a casing having a valve chamber and a port leading thereto, a valve plug mounted in said chamber and rotatable to selected angular positions, a sealing element movably mounted in said port, a spring holding the sealing element in yieldable engagement with the plug in selected angular positions of said plug, a cam carried by said plug at one end thereof, said cam being engageable with one portion of said sealing element for moving said portion out of contact with said plug when the latter is moved from one of said selected positions.

6. A valve comprising a casing having a valve chamber and a port leading thereto, a valve plug mounted in said chamber and rotatable to selected angular positions, an annular sealing element movably mounted in said port, a yieldable element holding the sealing element in engagement with the plug in selected angular positions of said plug, a cam at each end of the plug and turnable therewith, said cams being engageable with said sealing element at spaced points for moving said sealing element out of engagement with said plug when the latter is moved from a selected angular position to an intermediate position.

7. A valve comprising a casing having a valve chamber and a port leading thereto, a valve plug mounted in said chamber and rotatable to selected angular positions, a sealing element movably mounted in said port and having an annular sealing surface adapted to be seated against said plug by the action of a spring, said element having an abutment surface surrounding said sealing surface, a cam carried by said plug and engageable with said abutment surface for unseating said element from said plug when the latter is moved to an angular position intermediate said selected positions.

8. A valve comprising a casing having a valve chamber and a plurality of ports leading thereto, a valve plug mounted in said chamber and having a passage therethrough, said plug being rotatable to selected angular positions for registering said passage with selected ports, an annular sealing element in at least one of said ports and having a deformable sealing surface adapted to surround said passage and to be seated against said plug by the action of a spring when said passage is in register with the port containing said element, said element having an abutment surface exteriorly of said sealing surface and presented toward said plug, and a projection on said plug and engageable with said abutment surface for unseating said element from said plug when the latter is rotated to move the passage out of register with the port containing said element.

9. A valve comprising a casing having a valve chamber and a port leading thereto, a valve plug mounted in said chamber and rotatable to selected angular positions, a sealing element movably mounted in said port and adapted to seat against said plug, a cam carried by said rotor, said cam being out of contact with said element when said plug is in a selected angular position, a yieldable member for urging said element into seating engagement with said plug when said cam is out of engagement with said element, said cam being engageable with said element when the plug is moved from a selected angular position whereby said element is unseated from said plug.

10. A valve comprising a casing having a valve chamber and a plurality of radial ports leading thereto, a valve plug mounted in said chamber and having a passage therethrough, said plug being rotatable to selected angular positions for registering said passage with selected ports, an annular sealing element in each of said ports spring seated against said plug when the latter is in any of said selected positions, a camming ring attached to said plug and having cutouts opposite each of said ports when the plug is in any selected position, said ring having cam surfaces between said cutouts, said cam surfaces being adapted to engage said sealing elements for unseating the same when the plug is rotated to a position intermediate said selected positions.

11. A valve comprising a casing having a valve chamber and a port leading thereto, a valve plug mounted in said chamber and rotatable to selected angular positions, an annular sealing element pressed into engagement with the plug by a spring in selected angular positions of said plug, a cam at each end of the plug and turnable therewith, said cams being engageable with said sealing element at spaced points for moving said sealing element out of engagement with said plug when the latter is moved from a selected angular position to an intermediate position, said sealing element having a part closely fitted within said port to prevent tilting of said element when out of engagement with said plug.

ROBERT B. RESEK.

References Cited in the file of this patent

UNITED STATES PATENTS

| Number | Name | Date |
|---|---|---|
| 2,191,232 | Heinen | Feb. 20, 1940 |
| 2,297,161 | Newton | Sept. 29, 1942 |

FOREIGN PATENTS

| Number | Country | Date |
|---|---|---|
| 606,916 | Great Britain | of 1948 |